May 17, 1960

H. STINNES ET AL 2,936,549

GLASS MAKING APPARATUS

Filed Feb. 13, 1956

INVENTORS
Hans Stinnes
Hans Baumer
by Michael S. Striker
Agent

United States Patent Office 2,936,549
Patented May 17, 1960

2,936,549

GLASS MAKING APPARATUS

Hanns Stinnes, Mulheim an der Ruhr, and Hans Baumer, Gelsenkirchen-Buer, Germany, assignors to Mela, Maschinenbau und Reparatur Hans Stinnes, Gelsenkirchen-Buer, Germany Application February 13, 1956, Serial No. 565,260

3 Claims. (Cl. 49—54)

The present invention relates to an apparatus for making glass, and more particularly it relates to an apparatus for making glass which is substantially free of gas.

The use of continuously operating tank furnaces is well known in the glass making art. Customarily these tank furnaces consist of a melting tank and a working or receiving tank. The two tanks are rigidly connected with each other and are so arranged as to communicate at a level below the desired surface level of the molten glass. Thus, the molten glass in both tanks is in communicating relationship and the surface level of the molten glass in both tanks will automatically adjust itself to the same height. The melting tank comprises three zones. In the first zone which is customarily called the rough melting zone, glass-forming materials are introduced into the melting tank and are molten. In the second or refining zone, any solid particles remaining in the molten glass are dissolved or molten so that the molten glass leaving the second zone contains only liquid and gaseous constituents. Finally, in the clarifying or degassing zone, any gas still remaining in the molten glass is driven off by heat or other means. The molten glass is then ready for further processing and flows into the communicating working or receiving tank.

The speed of flow of the molten glass through the three zones in the melting tank and into the working or receiving tank is controlled by the rate of withdrawal of molten glass from the receiving tank. If too much molten glass is taken out of the receiving tank, that is if the rate of withdrawal of molten glass from the receiving tank is too great and consequently also larger quantities of glass-forming materials are introduced into the first or rough melting zone of the melting tank, the speed of flow of the molten glass through the three zones of the melting tank is increased to such an extent that, for instance, solid portions of the glass-forming material may be drawn from the rough melting zone, through the refining zone into the clarifying or degassing zone. Thereby an impure molten glass, containing stones, streaks and bubbles is formed. Thus, an excessive increase in the rate of withdrawal of molten glass from the receiving tank impairs the efficiency of the tank furnace and the quality of the produced glass.

It is therefore an object of the present invention to overcome the above mentioned difficulties in the production of glass.

It is another object of the present invention to provide an apparatus for making glass whereby the efficiency and production rate of the tank furnace can be increased without impairment of the quality of the produced molten glass.

It is yet another object of the present invention to provide an apparatus for making glass in a continuous process which can be easily and economically executed.

It is a further object of the present invention to provide an apparatus for making glass whereby a molten glass of even, high quality is produced irrespective of fluctuations in the operation of the tank furnace and in the rate of withdrawal of molten glass from the receiving tank.

Other objects and advantages of the present invention will become apparent from a further reading of the description and the appended claims.

With the above objects in view the present invention includes in an apparatus for use in the manufacture of glass and the like in combination, at least two spaced tanks adapted to contain molten material at different stages of manufacture respectively, and means for conveying the molten material in the form of a film of molten material from one tank to another tank so that gas may easily escape from the molten material during its movement between the tanks.

The present invention also includes in an apparatus for making glass in combination, converter means for converting glass-forming materials into gas-containing molten glass, receiving means for receiving substantially gas-free molten glass, and conveying means operatively connected with the converter means and with the receiving means, the conveying means including a supporting surface extending substantially from the converter means to the receiving means and adapted to support a film of molten glass flowing from the converter means to the receiving means whereby gas may easily escape from the film of flowing molten glass, and substantially gas-free molten glass will be received by the receiving means.

The present invention also comprises in an apparatus for making glass or the like including means for transporting a molten gas-containing material in a thin layer from one tank to another, the layer being sufficiently thin for the gas to pass therethrough and to escape therefrom while the molten material is transported between the tanks thereby forming a molten material substantially free of gas.

According to the present invention, the clarifying and degassing of the molten glass no longer takes place in the melting tank in which the molten glass forms a layer of considerable thickness, frequently 60 centimeters or even more, but instead in a device arranged between the melting tank and the working or receiving tank in which the molten glass flows as a film of considerably reduced thickness, preferably not exceeding 10 centimeters. Consequently also the surface area of the film of molten glass is greatly increased compared to the surface area of an equal quantity of molten glass contained in the melting tank.

The melting tank now comprises only the rough melting zone and the refining zone, while the clarifying and degassing of the molten glass takes place while the same is flowing in the form of a relatively thin film having a large surface area. The escape of gas from the molten glass is greatly facilitated by the reduction in thickness and the increase in surface area of the glass film. Consequently a more complete degassing is accomplished in a shorter period of time than was previously possible.

It is also within the scope of the present invention to control the temperature of the film or thin layer of molten glass flowing from the melting tank to the working or receiving tank. Due to the thinness of the film it is possible to quickly change its temperature and consequently its viscosity and to control the temperature of the molten glass film so as to obtain the best results under varying operating conditions and with varying glass composition. Generally it is preferred to maintain the temperature of the molten glass film at about the temperature of the molten glass in the melting tank or to increase the temperature of the glass film above the temperature of the molten glass in the refining zone of the melting tank. However, the present invention is not limited to any specific change of the temperature of the film of molten glass as compared with the temperature of the molten glass contained in the melting tank.

Because of its relative thinness, the speed of flow of the film of molten glass is considerably greater than the speed of flow of the molten glass in the melting tank. The increased speed of flow of the molten glass film causes a tearing apart and breaking of the gas bubbles in the molten glass and thus also mechanically furthers the degassing of the molten glass.

The maximum and preferred thickness of the film of molten glass flowing towards the working or receiving tank depends on many variable operating conditions such as the composition, viscosity and temperature of the molten glass. However it is generally preferred to maintain a thickness of the film of molten glass of between 0.5 millimeter and 10 centimeters. Excellent results were obtained by keeping the thickness of the molten glass film between 0.5 centimeter and 3 centimeters. Generally the thickness of the molten glass film may be increased in furnaces of larger capacity which are so equipped as to permit quick heating of the molten glass film to the desired temperature even in cases where the thickness of the molten glass film is increased. While the present invention is by no means limited to any specific maximum or minimum thickness of the film of molten glass, it is generally found that better results are obtained by not exceeding a thickness of 10 centimeters. It has been found advantageous to maintain a temperature of the film of molten glass which is somewhat higher than the temperature of the molten glass in the melting tank. Preferably the temperature of the film of molten glass is raised higher than 1,300° C., and most preferably it is raised to between 1,300–1,500° C.

According to a preferred embodiment of the present invention a glass film of extremely high purity and freeness of gas is obtained by preventing the formation of lateral end zones in the flowing film. When forming a band-like film it is sometimes difficult to prevent adherence of molten glass particles to the lateral walls of the film supporting structure. Such particles or portions of the molten glass will then solidify or at least substantially increase in viscosity and eventually will again be torn off and resume the flow towards the receiving or working tank. Thereby obviously the homogeneity of the film of molten glass entering the receiving tank and the quality of the glass is reduced. This can be avoided according to a preferred embodiment of the present invention by forming a film of molten glass having an annular continuous cross section. The cross section of the film will preferably be limited by two concentric rings, however a polygonal cross section or any other configuration which will form a continuous cross sectional area without lateral end zones is also within the scope of the present invention. For instance an elliptical band rather than a circular band may be preferred when the area of heat transfer is to be increased.

A film of such continuous cross section is obtained according to the present invention by guiding the flow of molten glass from the melting tank over a supporting surface formed by a suitably shaped body, in its simplest form over a cylinder of circular cross section. Preferably in the vicinity of the upper end of the body forming the supporting surface a distributor is arranged in the shape of a dome or head from which the flow of molten glass is evenly distributed over the entire supporting surface of the cylindrically or otherwise shaped body.

The supporting surface for the film of molten glass may be arranged in any desired shape and position between the melting tank and the working or receiving tank. It may for instance extend horizontally from the melting tank and molten glass may pass from the melting tank by way of a suitably formed overflow device onto the supporting surface. It is also within the scope of the present invention to employ mechanical means for drawing the flow of glass from the melting tank in horizontal or slightly downwardly inclined direction at a film over a supporting surface towards the receiving tank.

Preferably the flow of the film of molten glass towards the receiving tank will be actuated by the force of gravity. The receiving tank may, in accordance with the present invention, be arranged at a lower level than the melting tank. The difference in the height of the surface of the molten glass in the melting tank and in the receiving tank will cause the flow and unfolding of the film of molten glass on the supporting surface between the tanks.

In cases where a film of continuous cross sectional area is to be formed by passing the flow of molten glass over a continuous surface formed for instance by an upright cylinder, it is sometimes desirable to rotate the supporting cylinder about its axis. Such rotation may be caused by driving means, for instance an electrical motor which preferably is so arranged as to be outside of the heated area of the entire device, or, the force of gravity acting on the film of molten glass may also be employed to rotate the supporting body.

The supporting surface along which the film of molten glass flows towards the receiving tank is preferably enclosed in a shaft provided with suitable heating arrangements. The shaft therefore is preferably formed as a heating chamber and it is also contemplated within the scope of the present invention to provide a plurality of preferably adjacent heating chambers or shafts, which, respectively, may be used as recuperators being heated by the hot gases leaving the chamber through which the film of molten glass is flowing, and also being used as preheating chambers for a supporting body such as an upright cylindrical body before the same is being operatively connected with the melting and receiving tanks.

The supporting surface may also be formed in the shape of an inclined plane or as a step-like cascade arrangement.

It is also within the scope of the present invention to provide agitators on a rotatable supporting body, and to provide a plurality of melting tanks or a plurality of receiving tanks as well as to provide a plurality of both melting and receiving tanks which may be operatively connected by means of a film-forming supporting surface in any desired way.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
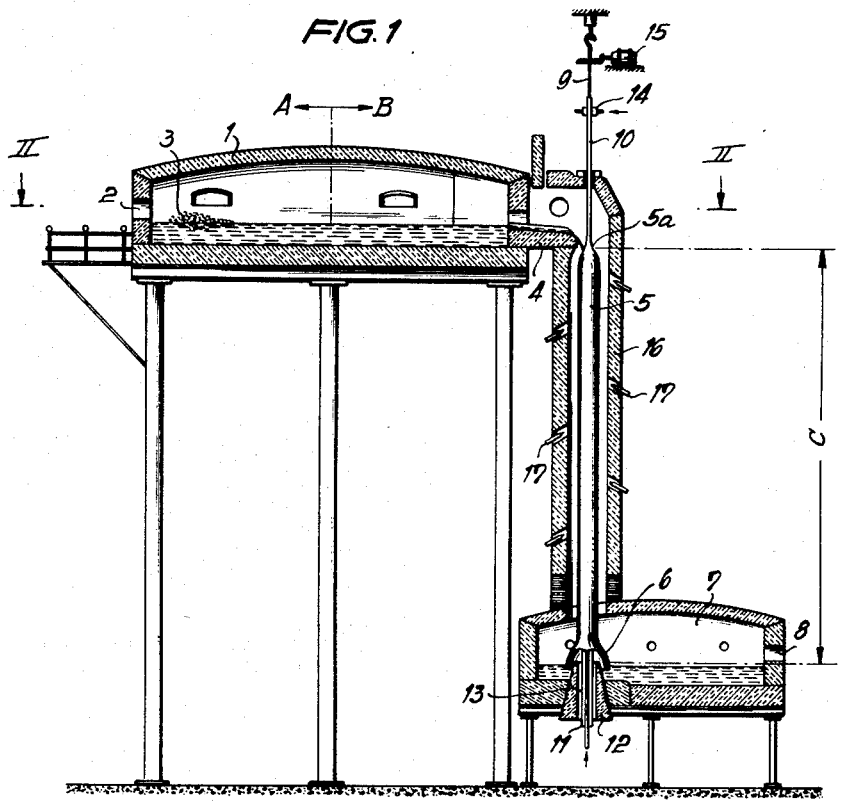
Fig. 1 is a sectional elevational view of an embodiment of the present invention.

Referring now to the drawing and particularly to Fig. 1, a melting tank 1 is shown comprising a rough melting zone A and a refining zone B. Glass forming material 3 is introduced into the melting tank through opening 2. Glass forming material 3 when introduced floats on the molten glass and slowly melts while still within the rough melting zone A. The molten mass then flows into the refining zone B in which the melting and dissolution process is completed so that the molten glass reaching the overflow 4 is completely free of any solid particles. The molten glass then passes along overflow 4 to the supporting body 5. It flows, supported by the outer surface of body 5 downwardly into receiving or working tank 7. In the illustrated embodiment, supporting body 5 comprises a hollow cylindrical body. The molten glass flowing downwardly on the outer surface of the supporting body 5 forms thereon a film and is simultaneously heated to the desired temperature, preferably between 1,300–1,500° C. Due to the thinness of the molten glass film and further helped by the elevated temperature and the movement of the glass film, which tends to break up and tear open any glass bubbles in the molten glass, the glass is completely degassed prior to reaching receiving tank 7.

The hollow supporting body 5 is formed on its lower end in the shape of a bell 6. Bell 6 extends downwardly below the surface of the molten glass in the receiving or working tank 7. Hollow supporting body 5 is adapted to be rotated about its axis and upon such rotation, the bell-shaped portion 6 will act as an agitator on the molten glass within working tank 7.

For further processing, the gas-free molten glass is removed from receiving or working tank 7 through opening 8. The hollow, cylindrically-shaped supporting body 5 is suspended from anchor rod 9 which passes through cooling pipes 10 and 11 through the interior of hollow body 5. The interior of hollow body 5 may be cooled by pumping water or air through pipes 10 and 11.

A frusto-conical stone 12 extends into the interior of receiving tank 7 through the bottom thereof. Stone 12 extends upwardly beyond the upper surface of the molten glass in receiving tank 7 and is formed with a cylindrical center bore 13. Cooling pipes 10 and 11 extend through bore 13 below the bottom wall of receiving tank 7 and may there be connected with suitable conduits for passing the cooling agent such as water or air through pipes 10 and 11. However introduction and removal of the cooling agent may also be effected from the upper portion of the cooling pipes 10 and 11 located above sleeve 14 in which the extended upper portion of body 5 is rotating. The supporting body 5 is rotated by means of motor 15 which is located outside of shaft 16 so as to rotate anchor rod 9 which in turn causes rotation of the entire supporting body 5. The main cylindrical portion of supporting body 5 is located inside vertical shaft 16. Shaft 16 is heated by the waste gases from working tank 7 and may also additionally be heated by burners 17 located in openings in the walls of shaft 16 so as to permit accurate control of temperature.

Figure 2:
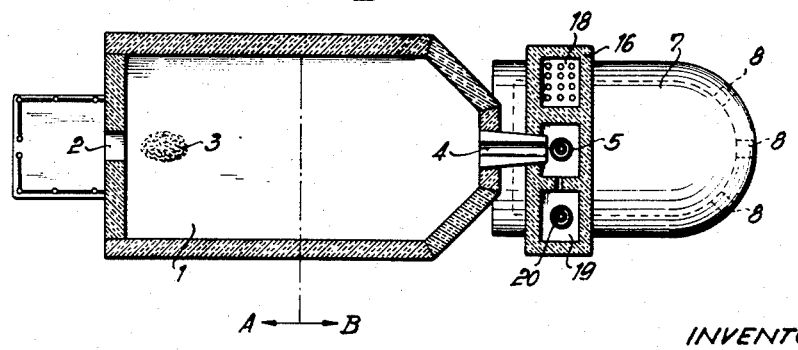
Fig. 2 is a sectional view taken along lines II—II of Fig. 1.

As shown in Fig. 2 a recuperator 18 is arranged adjacent to shaft 16 for the heating of air for working tank 7, and a preheating chamber 19 is arranged for preheating of a spare supporting body 20.

Figure 3:
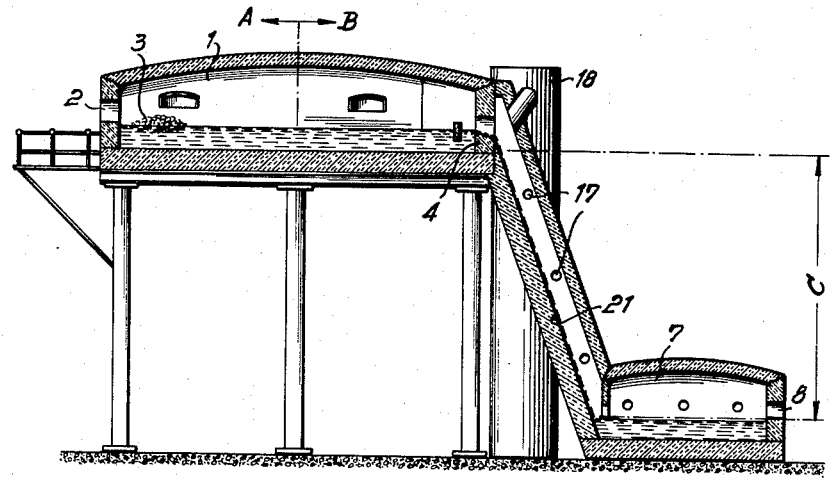
Fig. 3 is a sectional elevational view of another embodiment of the present invention.

In the embodiment illustrated in Fig. 3, the supporting surface 21 is formed as an inclined plane surface. The molten glass passes from the refining zone of melting tank 1 by way of an overflow onto the supporting surface 21. Supporting surface 21 is part of the inner surface of an inclined shaft. Burners 17 are provided in holes of the shaft walls for controlling the temperature inside the shaft. The molten glass flows as thin film-like layer along the supporting surface 21 into receiving tank 7 from where the now gas-free molten glass may be removed through opening 8.

Figure 4:
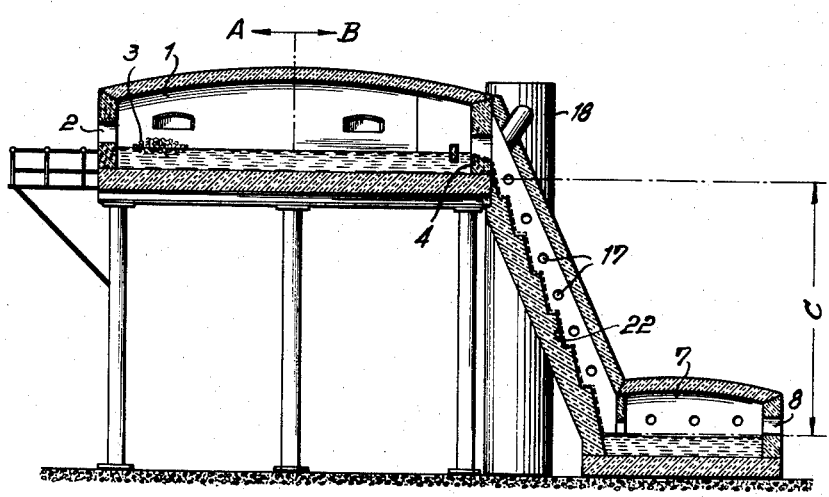
Fig. 4 is a sectional elevational view of still another embodiment of the present invention.

According to the embodiment illustrated in Fig. 4 a supporting surface 22 is shown in step-like, cascade arrangement. The refined glass flows from the refining zone of melting tank 1 onto the cascade supporting surface 22, forms thereon a thin film which reaches working or receiving tank 7.

In all of the three illustrated embodiments of the present invention, a film of refined molten glass is formed on a supporting surface and flows along the supporting surface into receiving tank 7. While flowing along the supporting surface, the temperature of the molten glass film is controlled by suitable arrangements such as burners 17 and also by the flow of hot gases from receiving tank 7 through the shaft in which the supporting surface is located. The gas which is still contained in the refined molten glass when the same reaches the supporting surface escapes from the molten glass film while the same flows towards receiving tank 7 so that the glass entering receiving tank 7 is substantially free of gas.

Thus, according to the present invention, the melting tank and the working or receiving tank are no longer arranged as communicating vessels so that the flow of molten glass is controlled by the rate of withdrawal of molten glass from the receiving tank, but instead the molten glass leaving melting tank 1 flows towards receiving tank 7 along a supporting surface on which the molten glass is stretched into a film of limited thickness and large surface area. Consequently, according to preferred embodiments of the present invention, the surface level of the molten glass in the receiving tank is considerably below the surface level of the molten glass in the melting tank.

The apparatus of the present invention according to which molten glass is transported in a thin layer from one tank to another is however not limited to any specific configuration of the supporting surface. It is for instance also possible to form a cascade-like supporting surface in which each of the substantially horizontal surface areas are shaped like shallow troughs. The supporting body 5 which has been illustrated as a hollow cylindrical body may also be of any other desired shape and cross section which will permit the forming on its outer surface of a continous film of molten glass. As shown in Figs. 3 and 4 the melting tank and working tank may be built as a unitary structure. However, as indicated in Fig. 1, it is also within the scope of the present invention to provide melting tanks and receiving tanks as separate units so that for instance several movable receiving tanks may be provided and may successively be operatively connected with the melting tank, so that receiving tanks may be exchanged without requiring freezing of the molten glass in the melting tank. The connecting and disconnecting of a plurality of tanks according to the present invention permits more efficient and more economical operation of the entire glass melting furnace, and especially permits better utilization of the expensive melting tank installation.

The following examples are given as illustrative only, the present invention however not being limited to the specific details of the examples.

*Example 1*

A mixture of glass forming materials consisting of 70 kilograms sand, 30 kilograms feldspar, 16.5 kilograms limestone, 15.5 kilograms sodium carbonate, 3.5 kilograms potassium carbonate and 1.7 kilograms sodium sulfate are introduced into the melting tank of an apparatus as illustrated in Fig. 1. The melting tank has a surface area of 20 square meters and glass-forming materials of the above described composition are introduced at such a rate that the layer of molten glass in the melting tank is maintained at a height of about 60 centimeters.

The total quantity of glass forming materials introduced into the melting tank through openings 2 amounts to 20 tons in 24 hours of continuous operation. Within the rough melting zone A a temperature of 1,400° C. is reached and maintained by customary gas-heating devices and serves for melting down of the glass-forming materials. The molten glass then flows slowly into the refining zone B in which the temperature of the molten glass amounts to about 1,350°. The heating gases flow parallel to the flow of the molten glass and leave the melting tank in the vicinity of the far end of zone B.

The molten glass is passed from the far end of zone B of the melting tank through an overflow 4 of semi-circular vertical cross section ($r=7$ cm.), and is conducted towards the upper end of cylindrical supporting body 5. Supporting body 5 has a diameter of about 30 centimeters. On the outer supporting surface of body 5 a film is formed by the molten glass which moves with a speed of about 30–40 centimeters per second downwardly towards the lower end of supporting body 5. The entire vertical length of the film path is about 250 centimeters.

A temperature of slightly in excess of 1,300° C. is maintained in the molten glass film. In order to prevent cooling and to maintain the temperature above 1,300° C. additional heat is provided by means of burners 17.

The molten glass film reaching the lower end of body 5 flows along the outer surface of the bell-shaped expansion 6 of supporting body 5 into the receiving or working tank 7. The temperature in receiving tank 7 is maintained at about between 1,200 and 1,250° C. The waste gases from receiving tank 7 are passed into shaft 16. The largest diameter of the bell-shaped portion of supporting body 5 is about 60 centimeters.

Receiving tank 7 has a surface area of 10 square meters and the gas-free molten glass is maintained therein in a height of between 30 and 35 centimeters. Frusto-conical stone 12 has at its uper end a diameter of 30 centimeters, at its lower end a diameter of 60 centimeters and has a height of 80 centimeters.

The interior of the cylindrical supporting body 5 is cooled by means of two concentric pipes having diameters of 3 and 4 inches respectively between which water flows throughout the entire length of supporting body 5.

All parts of the apparatus which come in direct contact with the molten glass are made of refractory material. The supporting body 5 is made of refractory material of especially high quality. The crown covering the tanks is formed in customary manner of silicate bricks. The water pipes are made of steel.

The molten glass obtained according to the continuous process of the example is entirely free of gas.

*Example 2*

A silicate glass is made from a mixture of glass-forming materials consisting of 80.4 kilograms sand, 1.5 kilograms alumina, 12 kilograms boric anhydride, 5.1 kilograms sodium oxide and 0.5 kilogram magnesium oxide, is introduced into the melting tank of an apparatus illustrated in Fig. 3.

The gas-free molten glass is formed similarly as described in Example 1, however, the melting temperature is kept at about 1,680° C., the temperature in the refining zone of the melting tank at about 1,500–1,550° C., the temperature of the molten glass film on the supporting surface at about 1,400–1,450° C., and the temperature of the gas-free molten glass in the receiving tank at between 1,300–1,350° C.

The gas-free molten glass obtained according to Examples 1 and 2 is completely gas-free and homogeneous.

It will be understood that each of the elements described above, or two or more together, may also find a useful application in other types of apparatus for use in the manufacture of glass and the like, differing from the types described above.

While the invention has been illustrated and described as embodied in an apparatus for making glass, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for use in the manufacture of glass and the like, in combination, an upper and a lower tank means adapted, respectively, to contain molten glass, said lower tank means including molten glass outlet means spaced from the bottom thereof; a downwardly extending heatable elongated vertical chamber connecting said tank means; a material-transferring elongated substantially cylindrical carrier member rotatable about its axis located at least partially inside said downwardly extending elongated vertical chamber spaced from the inner surface thereof; and means for rotating said rotatable elongated carrier member about its axis, said carrier member extending in longitudinal direction of said vertical chamber downwardly through the entire length thereof and below said molten glass outlet means into said lower tank means for transferring molten glass in a free-flowing stream from said upper tank means onto the upper partion of said carrier member; means for rotatably supporting said rotatable elongated carrier member, whereby molten glass while being transferred from said upper tank means to said lower tank means will flow downwardly along said carrier member substantially covering the entire outer surface thereof forming a continuous thin annular film thereon, so that gas contained in said molten glass will escape therefrom during said downward flow thereof, and whereby the glass film will flow from the lower portion of said carrier member into the molten glass contained in said lower tank means without occluding air due to said carrier member's lower end portion extending beneath the level of the molten glass in said lower tank means.

2. In an apparatus for use in the manufacture of glass and the like, in combination, an upper and a lower tank means adapted, respectively, to contain molten glass; a downwardly extending elongated vertical chamber connecting said tank means; a material-transferring elongated carrier member rotatable about its axis and located at least partially inside said downwardly extending elongated vertical chamber spaced from the inner surface thereof; means for transferring molten glass from said upper tank means onto the upper portion of said carrier member; means for rotatably supporting said rotatable elongated carrier member and means for rotating said rotatable elongated carrier member about its axis, said carrier member extending in longitudinal direction of said vertical chamber downwardly through the entire length thereof and a considerable distance into said lower tank means, beneath the level of molten glass located therein, whereby molten glass while being transferred from said upper tank means to said lower tank means will flow downwardly along said carrier member substantially covering the entire outer surface thereof forming a continuous thin annular film thereon, so that gas contained in said molten glass will escape therefrom during said downward flow thereof, and whereby the glass film will flow from the lower portion of said carrier member into the molten glass contained in said lower tank means without occluding air due to said carrier member's lower end portion extending beneath the level of the molten glass in said lower tank means.

3. In an apparatus for use in the manufacture of glass and the like, in combination, an upper and a lower tank means adapted, respectively, to contain molten glass; a downwardly extending elongated vertical chamber connecting said tank means; a material-transferring elongated carrier member located at least partially inside said downwardly extending elongated vertical chamber spaced from the inner surface thereof and extending in longitudinal direction of said vertical chamber from the upper portion thereof downwardly through the entire length thereof and a considerable distance into said lower tank means, beneath the level of molten glass located therein; means for transferring molten glass from said upper tank means onto the upper portion of said carrier member; means for rotatably supporting said rotatable elongated carrier member; means for rotating said rotatable elongated carrier member about its axis; and stirring means attached to the lower end portion of said elongated carrier member, located in said lower tank means extending below the normal level of glass therein, whereby molten glass while being transferred from said upper tank means to said lower tank means will flow downwardly along said carrier member substantially covering the entire outer surface thereof forming a continuous thin annular film thereon, so that gas contained in said molten glass will escape therefrom during said downward flow thereof, and whereby the glass film will flow from the lower portion of said carrier member into the molten glass contained in said lower tank means without occluding air due to said carrier member's lower end portion extending beneath the level of the molten glass in said lower tank means.

References Cited in the file of this patent

UNITED STATES PATENTS

| | | |
|---|---|---|
| 858,085 | Lubbers | June 25, 1907 |
| 1,027,933 | Thenis | May 28, 1912 |
| 1,646,705 | Peiler | Oct. 25, 1927 |
| 1,831,619 | Allen | Nov. 10, 1931 |
| 1,872,664 | Brown | Aug. 23, 1932 |
| 1,963,763 | Smith | June 19, 1934 |
| 1,986,575 | Honiss | Jan. 1, 1935 |
| 2,207,764 | Soubier | July 16, 1940 |
| 2,411,031 | Deyrup | Nov. 12, 1946 |
| 2,474,302 | Danner | June 28, 1949 |
| 2,485,851 | Stevens | Oct. 25, 1949 |
| 2,520,577 | Tooley | Aug. 29, 1950 |
| 2,587,914 | Smith | Mar. 4, 1952 |

FOREIGN PATENTS

| | | |
|---|---|---|
| 629,811 | Great Britain | Sept. 28, 1949 |